United States Patent [19]

Jordan

[11] 4,113,398

[45] Sep. 12, 1978

[54] REINFORCED APERTURE IN MOLDED PLASTIC ARTICLE

[76] Inventor: Edgar R. Jordan, 32260 W. Twelve Mile, Farmington, Mich. 48024

[21] Appl. No.: 720,107

[22] Filed: Sep. 3, 1976

[51] Int. Cl.² ............................................. B25G 3/34
[52] U.S. Cl. ................................... 403/267; 264/271; 403/408; 403/410
[58] Field of Search ............... 403/265, 266, 267, 224, 403/228, 229, 404, 408; 264/271, 273, 275

[56] References Cited

U.S. PATENT DOCUMENTS

| 2,672,070 | 3/1954 | Forster | 264/271 X |
| 2,691,971 | 10/1954 | Dutterer | 403/267 X |
| 3,147,963 | 9/1964 | Frazier | 403/224 X |
| 3,422,592 | 1/1969 | Gjerde | 403/267 X |
| 3,426,613 | 2/1969 | Conrad | 264/271 X |
| 3,552,787 | 1/1971 | Yee | 403/265 |

*Primary Examiner*—Wayne L. Shedd
*Attorney, Agent, or Firm*—Charles W. Chandler

[57] ABSTRACT

A method for molding a wire insert in the body of a plastic article to reinforce a bolt-receiving opening. The wire insert is formed of a wire coil in which each convolution of the coil is in contact with its neighboring convolution. The coil has openings between adjacent convolutions to permit liquid plastic to flow between the convolutions as the article is being molded so that the coil is embedded within the plastic.

4 Claims, 3 Drawing Figures

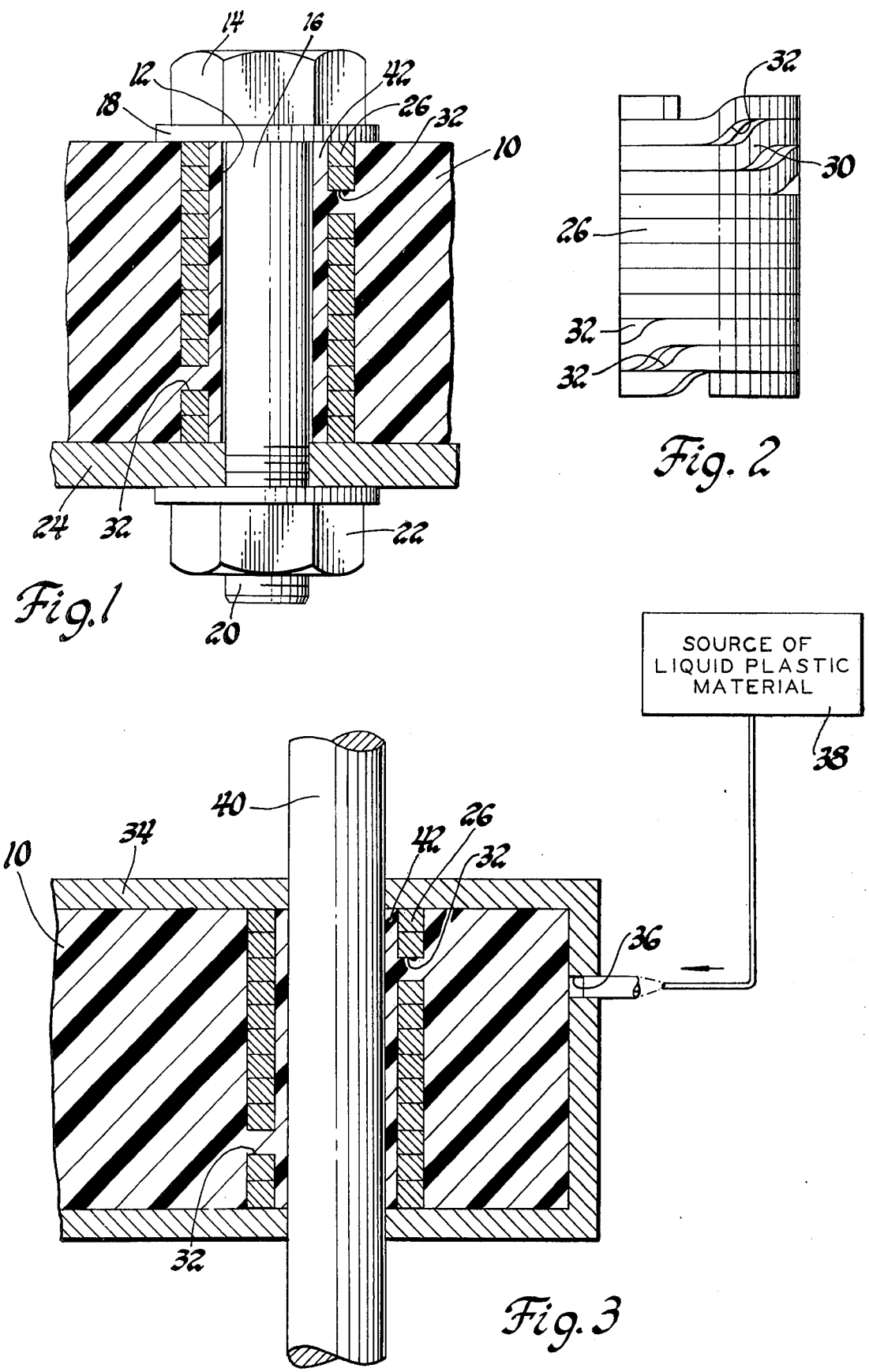

REINFORCED APERTURE IN MOLDED PLASTIC ARTICLE

BACKGROUND OF THE INVENTION

This invention is related to insert means for reinforcing bolt-receiving openings of plastic articles, and more particularly, to a method for making a plastic article having a wire coil insert in which the liquid plastic passes between adjacent convolutions of the wire insert to embed each coil within the plastic.

It is frequently desirable in industrial applications to fasten an article of plastic material to another object by using a nut and bolt or other metal threaded fastener. However, some plastic materials tend to creep when subjected to the pressures commonly applied by a nut and bolt fastener or a screw. As the plastic creeps, the fastener becomes loose.

The prior art discloses the use of a wire coil insert for lining an opening in a plastic article. However, a problem arises in using conventional methods for effectively anchoring the wire coil to the plastic article.

SUMMARY OF THE INVENTION

The broad purpose of the present invention is to provide a method for molding a wire coil insert into a plastic article so that the insert is firmly anchored in position for reinforcing an opening for receiving a bolt through the insert to attach the plastic article to another article. Another object of the invention is to provide a novel form of metal insert for reinforcing the bolt-receiving opening of a plastic article, comprising a wire coil having adjacent convolutions of the coil formed to provide an opening between them for passing liquid plastic so that the coil is encapsulated within the plastic body.

In the preferred embodiment of the invention, the insert comprises a wire coil in which each convolution of the coil contacts its neighboring convolution to support fastener forces applied to opposite ends of the coil. Each coil is formed with a kink so that there is an opening between adjacent coils permitting the liquid plastic to flow into the interior of the coil when the article is being molded thereby preventing any relative motion between the insert and the plastic body.

Still further objects and advantages of the present invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which:

FIG. 1 is a sectional view through a plastic article formed in accordance with the preferred embodiment of the invention, FIG. 2 is a view of the preferred insert, and FIG. 3 is a fragmentary view of apparatus for making a plastic article in accordance with the invention.

DESCRIPTION OF THE PREFERRED EMBODIMENT

Referring to the drawing, FIG. 1 illustrates a body 10 formed of a conventional plastic material. Body 10 has an elongated cylindrical bolt-receiving opening 12. A bolt 14 has a body 16 received within opening 12. The head of bolt 14 is seated on a washer 18. The opposite end of the bolt body is threaded at 20. A nut 22 is mounted on threaded portion 20 for fastening a member 24 to body 10. Nut 22 is fastened so that the bolt head and the nut cooperate in applying a compressive force on body 10 and member 24 in the manner well known to those skilled in the art.

An insert 26 is embedded in body 10 about opening 12. Insert 26 comprises a cylindrical wire coil in which one end of the coil is engaged with washer 18 and the opposite end of the coil is engaged with member 24. Referring to FIG. 2, each convolution of the coil is kinked at 28 adjacent a similarly formed kink 30 in a neighboring convolution to form an opening 32 between each pair of convolutions. Preferably openings 32, between the neighboring convolutions, are formed in a helical arrangement from one end of the coil toward its opposite end.

Referring to FIG. 3, body 10 is formed, for purposes of illustration, in a hollow mold 34 having an opening 36 for receiving a liquid plastic from a source 38 into the mold cavity. A rod 40 is mounted in the mold to form opening 12 of the finished plastic article. Insert 26 is disposed in the mold about the rod to define a cylindrical chamber 42 between insert 26 and rod 40. As liquid plastic is introduced into the mold, the plastic passes through each opening 32 into cylindrical chamber 42 to form the wall of opening 12. The plastic is disposed in both the interior and the exterior of the insert, as well as within each mold opening thereby firmly anchoring the insert in position. The plastic is then permitted to form a solid body in accordance with the usual practice. Then rod 40 is removed from the mold, and body 10 is removed from the mold to form the finished product.

It is to be noted that since each convolution of the insert contacts its neighboring coils, the coil forms substantially a metal cylinder for supporting the compressive forces applied between head 14 of the bolt and nut 22. In addition, because the plastic is disposed both on the interior and the exterior of each coil of the insert as well as within openings 32, the insert is rigidly anchored in the finished plastic article.

Having described my invention, I claim:

1. A combination comprising:
    a body formed of a molded plastic material, said body having an opening formed therein,
    an insert molded in said body, said insert comprising a wire member formed into a coil having a plurality of convolutions each convolution having a diameter greater than the diameter of the body opening and being embedded in the body such that each convolution is disposed about said opening, each convolution being in contact with its neighboring convolution, and
    a fastener being disposed in the body opening, the fastener having a head engaged with one end of the coil, and means carried on the opposite end of the fastener for engaging the opposite end of the coil.

2. A combination as defined in claim 1, in which at least a pair of said convolutions have a second opening between them and including a portion of said plastic body being disposed in said second opening.

3. A combination as defined in claim 2, in which the second opening is formed to pass plastic therethrough to form the first mentioned opening.

4. A combination as defined in claim 2, in which each pair of neighboring convolutions of the coil has an opening between them.

* * * * *